US012488347B2

(12) United States Patent
Nesheim et al.

(10) Patent No.: US 12,488,347 B2
(45) Date of Patent: Dec. 2, 2025

(54) INCREASED NETWORK SECURITY USING A SECURE TOKEN EXCHANGE

(71) Applicant: Dwolla, Inc., Des Moines, IA (US)

(72) Inventors: Skyler Nesheim, Des Moines, IA (US); Nicholas Leeper, Des Moines, IA (US); Nicholas Schulze, Des Moines, IA (US)

(73) Assignee: DWOLLA, INC., Windsor Heights, IA (US)

( * ) Notice: Subject to any disclaimer, the term of this patent is extended or adjusted under 35 U.S.C. 154(b) by 94 days.

(21) Appl. No.: 18/143,901

(22) Filed: May 5, 2023

(65) Prior Publication Data

US 2024/0370868 A1  Nov. 7, 2024

(51) Int. Cl.
G06Q 20/40 (2012.01)
G06Q 20/10 (2012.01)

(52) U.S. Cl.
CPC ....... *G06Q 20/4014* (2013.01); *G06Q 20/108* (2013.01)

(58) Field of Classification Search
None
See application file for complete search history.

(56) References Cited

U.S. PATENT DOCUMENTS

| | | | |
|---|---|---|---|
| 2018/0219846 A1* | 8/2018 | Poschel | H04L 63/0807 |
| 2021/0279310 A1* | 9/2021 | Apsingekar | G06F 21/604 |
| 2021/0328973 A1* | 10/2021 | Sarkissian | G06F 21/6245 |
| 2022/0222654 A1* | 7/2022 | Pronski | G06Q 30/0637 |
| 2023/0394173 A1* | 12/2023 | Viswanathan | G06F 21/6227 |
| 2024/0281799 A1* | 8/2024 | Ryan | G06Q 20/3678 |

OTHER PUBLICATIONS

Tim Winston et. al., "How to use tokenization to improve data security and reduce audit scope", Jan. 25, 2022 (Year: 2022).*

* cited by examiner

*Primary Examiner* — Jacob C. Coppola
*Assistant Examiner* — Timothy Paul Sax
(74) *Attorney, Agent, or Firm* — Hickman Becker Bingham Ledesma LLP

(57) ABSTRACT

Techniques provided for using a secure token exchange between services that require access to the same sensitive information. Using the techniques, a client application may send a token provided by a first service to second service in order for the second service to obtain, directly from the first service, the sensitive information that corresponds to the token. Because the sensitive information is not sent from the first service to the client application, and from the client application to the second service, security vulnerabilities are avoided.

17 Claims, 4 Drawing Sheets

INCREASED NETWORK SECURITY USING A SECURE TOKEN EXCHANGE

FIELD OF THE INVENTION

The present invention relates to increasing security of sensitive information and, more specifically, to techniques for using tokenization without exposing client applications to underlying sensitive information.

BACKGROUND

"Tokenization" is the process of replacing sensitive data with identifiers referred to as "tokens". A system that creates a token (a "token-originating system") generally stores (a) the sensitive data that corresponds to the token, and (b) data that correlates the sensitive data with the token. Thus, to the token-originating system, a token uniquely identifies the sensitive data that the token replaces. However, to nefarious third-parties, the sensitive data is not derivable based on the token itself. Consequently, when a system has created a token for a particular set of sensitive data, it is safer to communicate with the system using the token rather than using the sensitive data itself.

For example, a medical management system may maintain sensitive personal information for a patient. To protect the sensitive information from exposure, the medical management system may create a token that represents that sensitive information, and send the token back to the patient's client application. Thereafter, when the client application needs to refer to the sensitive information, the client application may merely send the token back to the medical management system. The medical management system may use the token to look up the sensitive information to which the token corresponds.

Because the client application can effectively communicate the sensitive information to the medical management system based only on the token, interactions between the client application and the medical management system do not require sending the sensitive information between the client and the token-originating system. Consequently, such interactions are much less likely to expose the sensitive information to nefarious third-parties.

Unfortunately, the usefulness of tokenization is limited by the fact that a token is only meaningful to the token-originating system. For example, there are times where a client application may need to provide the sensitive information that is represented by a token to a system other than the token-originating system. FIG. 1 is a block diagram representing such a scenario.

Referring to FIG. 1, a service 102 interacts with a client application 130 through an API 132. In the illustrated scenario, service 102 has created a token A for sensitive information (INFO X). In a first interaction, service 102 sends the token A to the client application 130. In a second interaction, the client application 130 sends the token back to service 102 when necessary to specify INFO X.

At some point, client application 130 may need to provide INFO X to another service 100. Under these circumstances, the client application 130 will typically request the sensitive information from the token-originating system by sending the token to the token-originating system. Based on the token, the token-originating system will look up and retrieve the sensitive information, and send the sensitive information back to the client application 130. In the illustrated embodiment, service 102 sends INFO X to client application 130 in the third interaction. The client application may then send the sensitive information to another service (the fourth interaction). Exposing the client application 130 to the sensitive information in this manner, as well as including the sensitive information itself in network transmissions (interactions 3 and 4), create security vulnerabilities that nefarious third parties may exploit.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described hereafter for providing a secure token exchange between services that require access to the same sensitive information. Using the techniques, a client application may send a token provided by a first service to second service in order for the second service to obtain, directly from the first service, the sensitive information that corresponds to the token. Because the sensitive information is not sent from the first service to the client application, and from the client application to the second service, security vulnerabilities are avoided.

Sensitive Information

As used herein, the term "sensitive information" generally refers to any information for which it may be desirable to restrict exposure. Sensitive information may include, but is not limited to bank account number, routing information, birthdates, names, addresses, phone numbers, credit card information, medical information, transaction histories, risk scores, etc. The techniques described herein are not limited to any particular form of sensitive information.

Secure Token Exchange Example

Figure 1:
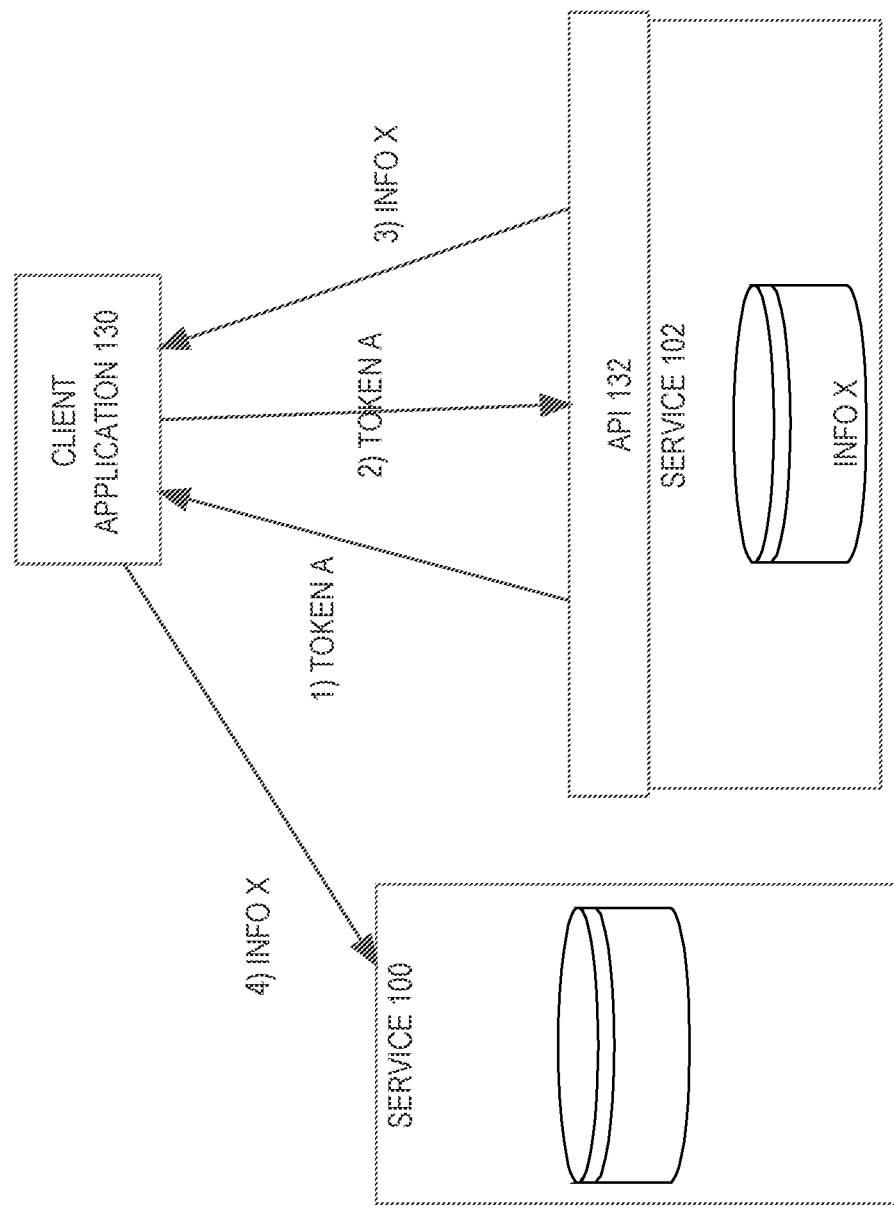
FIG. 1 is a block diagram of how sensitive tokenized information is conventionally provided from one service to another service in a manner that exposes the client application to the sensitive information.
Figure 2:
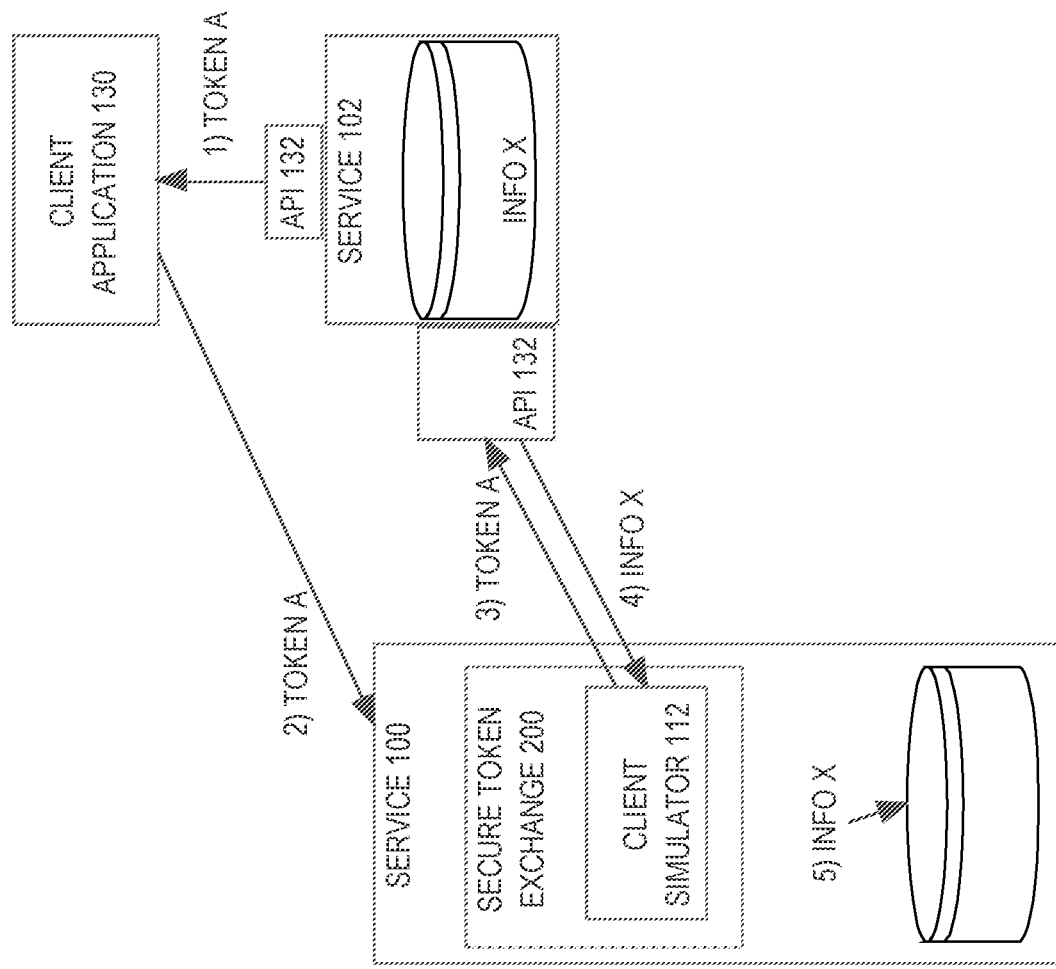
FIG. 2 is a block diagram of how sensitive information may be provided from one service to a service that incorporates a secure token exchange without exposing the client application to the sensitive information, according to one implementation.

Referring to FIG. 2, it is a block diagram that illustrates use of a secure token exchange according to one implementation. Similar to the scenario illustrated in FIG. 1, the sensitive information (INFO X) is stored at service 102. Service 102 generates token A that corresponds to INFO X and provides token A to client application 130. Also similar to the scenario illustrated in FIG. 1, service 100 needs access to INFO X. However, rather than client application 130 retrieving INFO X from service 102 and providing INFO X directly to service 100, client application 130 sends token A to service 100 to enable service 100 to retrieve INFO X from service 102 using a secure token exchange 200.

Service 100 receives token A and determines that token A is an "unknown external token". At this point token A is "unknown" to service 100 because service 100 has not previously seen token A. Token A is an "external" token because it was not created by service 100. In response to receiving token A, service 100 provides token A to the secure token exchange 200. The secure token exchange 200 sends token A to service 102. In response, service 102 sends INFO X directly to service 100 through the secure token exchange 200. Upon receiving INFO X from service 102, service 100 may save INFO X locally so that it need not be retrieved from an external service every time it is needed.

As is evident by the interactions illustrated in FIG. 2, the ability of secure token exchange 200 to retrieve sensitive data directly from other services (e.g. service 102) avoids the need to expose client application 130 to the sensitive data itself. Rather, the sensitive data is transmitted in secure service-to-service communications that do not involve the client application 130. Since interactions between the services and the client application 130 only involve the transmission of the token, security vulnerabilities are avoided.

Client Simulators

According to one implementation, secure token exchange 200 retrieves INFO X from service 102 by causing a client simulator 112 to send a request to the same API 132 that service 102 exposes to client application 130. Client simulator 112 generally represents logic specifically designed to interact with API 132 supported by service 102. In response to the request, service 102 provides INFO X to secure token exchange 200 in the same manner as INFO X would be provided to a client application.

The use of client simulators to interact with external token-originating services allows service 100 to support secure token exchange with multiple services, each of which may have its own proprietary API.

Figure 3:
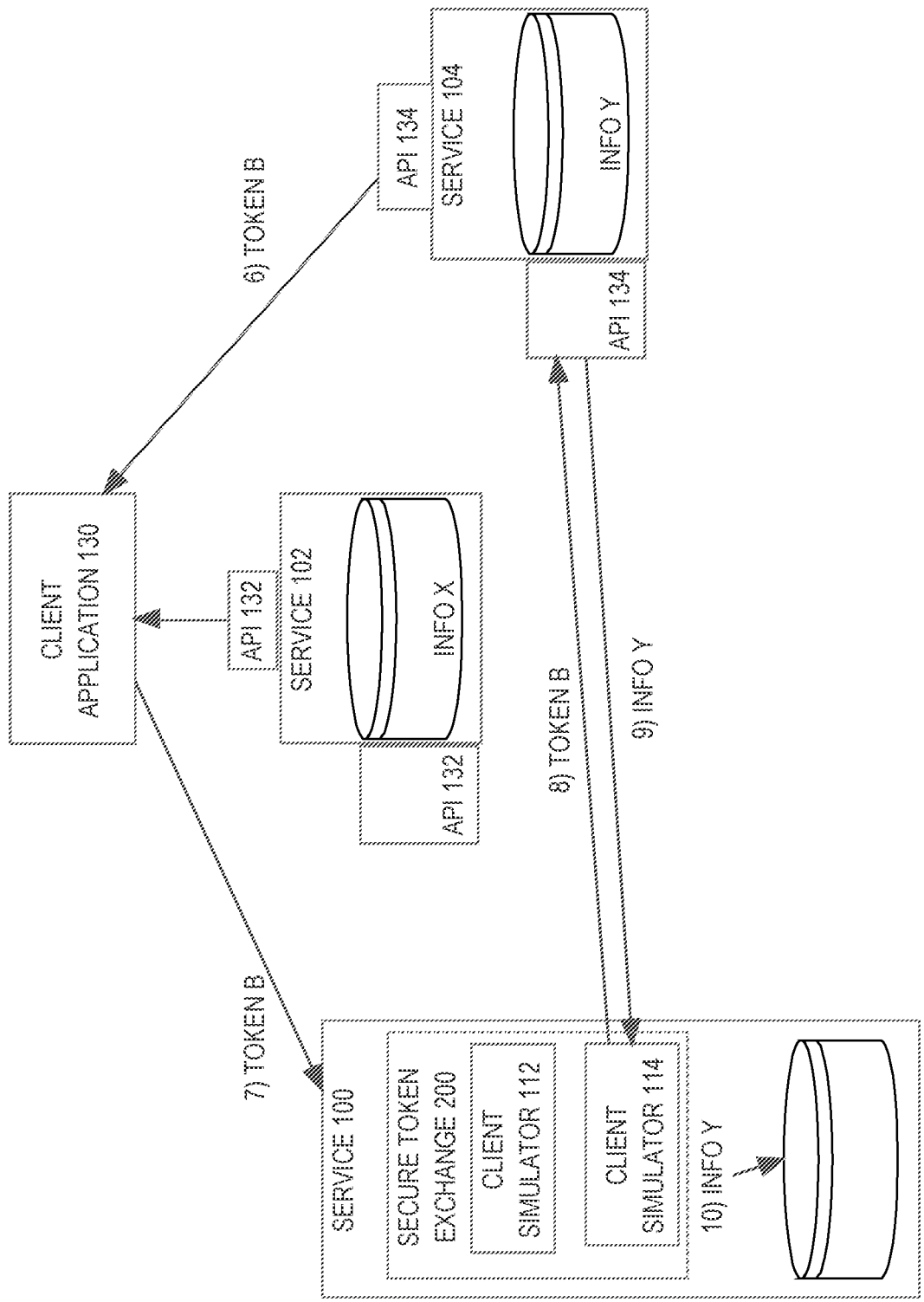
FIG. 3 is a block diagram of how a service with a secure token exchange may interact with several third-party token-originating services, according to an embodiment.

In the example illustrated in FIG. 3, secure token exchange 200 includes a second client simulator 114 specifically designed to interact with an API 134 provided by yet another external service 104. Referring to FIG. 3, it is a block diagram that depicts how service 100 may securely obtain sensitive information from service 104. Similar to the scenario illustrated in FIG. 2, the sensitive information (INFO Y) is stored at service 104. Service 104 generates token B that corresponds to INFO Y and provides token B to client application 130. Also similar to the scenario illustrated in FIG. 2, service 100 needs access to INFO Y. However, rather than client application 130 retrieving INFO Y from service 104 and providing INFO Y to service 100, client application 130 sends token B to service 100.

Service 100 receives token B and determines that token B is an unknown external token. In response to receiving token B, service 100 provides token B to secure token exchange 200. Secure token exchange 200 sends token B to service 104 using client simulator 114. In response, service 104 sends INFO Y to secure token exchange 200 of service 100. Upon receiving INFO Y from service 104, service 100 may save INFO Y locally so that it need not be retrieved from an external service every time it is needed.

Although the API 134 provided by service 104 may be significantly different than the API 132 provided by service 102, from the perspective of client application 130 the interaction with service 100 is the same. Namely, client application 130 provides the relevant tokens to service 100 and relies on service 100 to use secure token exchange 200 to securely obtain sensitive information from external services based on the tokens.

The fact that interaction between client application 130 and service 100 does not change based on the external service from which sensitive information is obtained is beneficial for a variety of reasons. For example, a user may initially use service 102 to manage a bank account. During this period, service 102 serves as the user's source for a certain set of sensitive data (e.g. bank account and routing number). While using service 102, the user may make use of service 100 in a way that makes use of that sensitive data (e.g. to transfer funds from the bank account). At some point, the user may decide to switch from service 102 to service 104.

After the switch, client application 130 may use service 100 in the same manner as before the switch, with the difference being that, after the switch, the token sent from client 130 to service 100 will have been originated at service 104, and service 100 will obtain the sensitive information from service 104.

Caching Sensitive Data

As mentioned above, after retrieving sensitive information from other services based on the tokens generated by those services, service 100 may store that information locally. In addition, secure token exchange 200 may store data that associates the tokens (originated by external services) with the locally-stored sensitive information. Consequently, when service 100 receives another message from client application 130 that includes token B, service 100 may retrieve INFO Y from local storage based on token B, rather than sending another request to service 104 for INFO Y. The local storage of system 100 may thus serve as a cache for sensitive information retrieved from external services based on tokens that were generated by those external services. Because the sensitive information is sensitive, system 100 may store the sensitive information in an encrypted format.

Certain types of sensitive information are only valid for a limited duration. For example, INFO Y that is retrieved from service 104 may indicate that a particular bank account has sufficient funds to cover a particular purchase. This "sufficient balance" information is only valid at the time it is retrieved, because soon thereafter the user may make purchases that significantly reduce the balance in the account.

As another example, a token-originating service may be configured to generate a "risk score" for a specified transaction. Such risk scores are affected by many variables that change over time. Consequently, a risk score generated at one point in time may not be accurate for another point in time even if the parties, accounts, and details of the transaction itself have not changed.

Therefore, according to one embodiment, some or all of the cached sensitive information maintained in service 100 may include an expiration timestamp, after which the information is not to be used. Periodically, service 100 may deallocate the storage space used by expired sensitive information. Even if sensitive information has not expired, service 100 may deallocate it if it is the least recently used sensitive information in the cache of service 100, and space is needed to store newly-requested sensitive information.

Because the sensitive information is cached in service 100, some sensitive information need only be transferred to service 100 once. For example, assume that, while using service 102 as the source for bank account and routing information, client application 130 may cause service 100 to retrieve the bank account and routing information directly from service 102. After retrieving the bank account and routing information, service 100 may store the information locally. At that point, the user of client application may switch to service 104 as its source of bank account and routing information. However, if client application 130 requests service 100 to perform a task (e.g. fund transfer) that requires the bank account and routing information, service 100 may perform the task based on its already-stored information rather than retrieving the information from service 104.

Sensitive Information Retrieval Request

The message sent by client application 130 to service 100 that causes service 100 to obtain sensitive information from a third-party service based on a token that was created by the third-party service is referred to herein as a sensitive information retrieval request (SIRR). According to one implementation, in addition to the token itself, an SIRR contains (a) sufficient information to enable service 100 to identify the token-originating third-party service (and the appropriate API of the third-party service), and (b) an indication of what pieces of information are covered by the token.

The identity of the token-originating service enables service 100 to send token to the appropriate API of the appropriate third-party service. The information about the data covered by the token is used by service 100 to know what it is getting from the third-party service so that (a) service 100 may use the data to perform the task requested by client 130, and (b) service 100 know where and how to store the data within service 100 so that the data can be reused without needing to be re-retrieved from the third-party service.

Task Request Example

Often, the client application 130 will submit an SIRR to service 100 in response to service 100 indicating that service 100 needs information to perform a requested task. For example, client application 130 may initially send service 100 an indication that the user of client application 130 desires to perform a transfer of funds. In response to such a task request, service 100 (a) determines which information is needed to perform the task, and (b) whether service 100 already has the needed information. Service 100 may already have the information, for example, if the information was cached in service 100 from a prior retrieval, as explained above. For any information needed to perform the requested task that service 100 does not have (or has expired), service 100 sends a request to client application 130 that indicates the information needed to perform the requested task.

Rather than obtain the needed data directly from a third-party service, client application 130 obtains a token for the data from the third-party service (e.g. service 104), and sends the token in a SIRR back to service 100. Service 100 then provides the token to secure token exchange 200 to enable secure token exchange 200 to obtain the sensitive information directly from the third party service, as described above. Once all sensitive information needed to perform the task has been obtained in this manner, service 100 performs the requested task.

Using a Secure Token Exchange with Third Party Services

In the examples given in FIGS. 2 and 3, service 100 incorporates a secure token exchange 200 to obtain sensitive information from third parties based on tokens from those third parties. Service 100 does so in order to facilitate its own services (which may require the sensitive information from the third parties) without exposing the sensitive information to client applications. However, third-party services may also want to have this same ability. According to one implementation, rather than implement their own secure token exchanges, such third party services may interact with secure token exchange 200, according to some pre-established protocol, to obtain sensitive information from other third parties.

For example, referring again to FIG. 3, assume that service 102 provides some service that requires INFO Y from service 104. Under these circumstances, client application 130 may obtain token B (the token for INFO Y) from service 104. Client application 130 may then provide token B to service 102. Service 102 may then interact with the secure token exchange 200 according to the protocol, providing token B to secure token exchange 200. Secure token exchange 200 may then obtain the INFO Y from service 104 using client simulator 114 to send token B to service 104 through API 134. In response, service 104 provides INFO Y to secure token exchange 200, which provides INFO Y to service 102. Upon receiving INFO Y, service 102 may perform the initial service requested by client application 130. During this process, one third-party service (service 102) obtains sensitive information from another third party service (service 104) using secure token exchange 200 without exposing client application 130 to that sensitive information.

In another implementation, third-party services may register their services with secure token exchange 200. In such an implementation, client application 130 may request service 100 to perform one of the services registered by a third party. Service 100 obtains any sensitive information that it needs to perform a registered third-party service using secure token exchange 200, and then invokes the appropriate registered third-party service.

These are merely examples of the many ways third-party services may make use of secure token exchange 200 without having to implement their own secure token exchange. Hence, the use of secure token exchange 200 by third party services is not limited to any particular implementation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
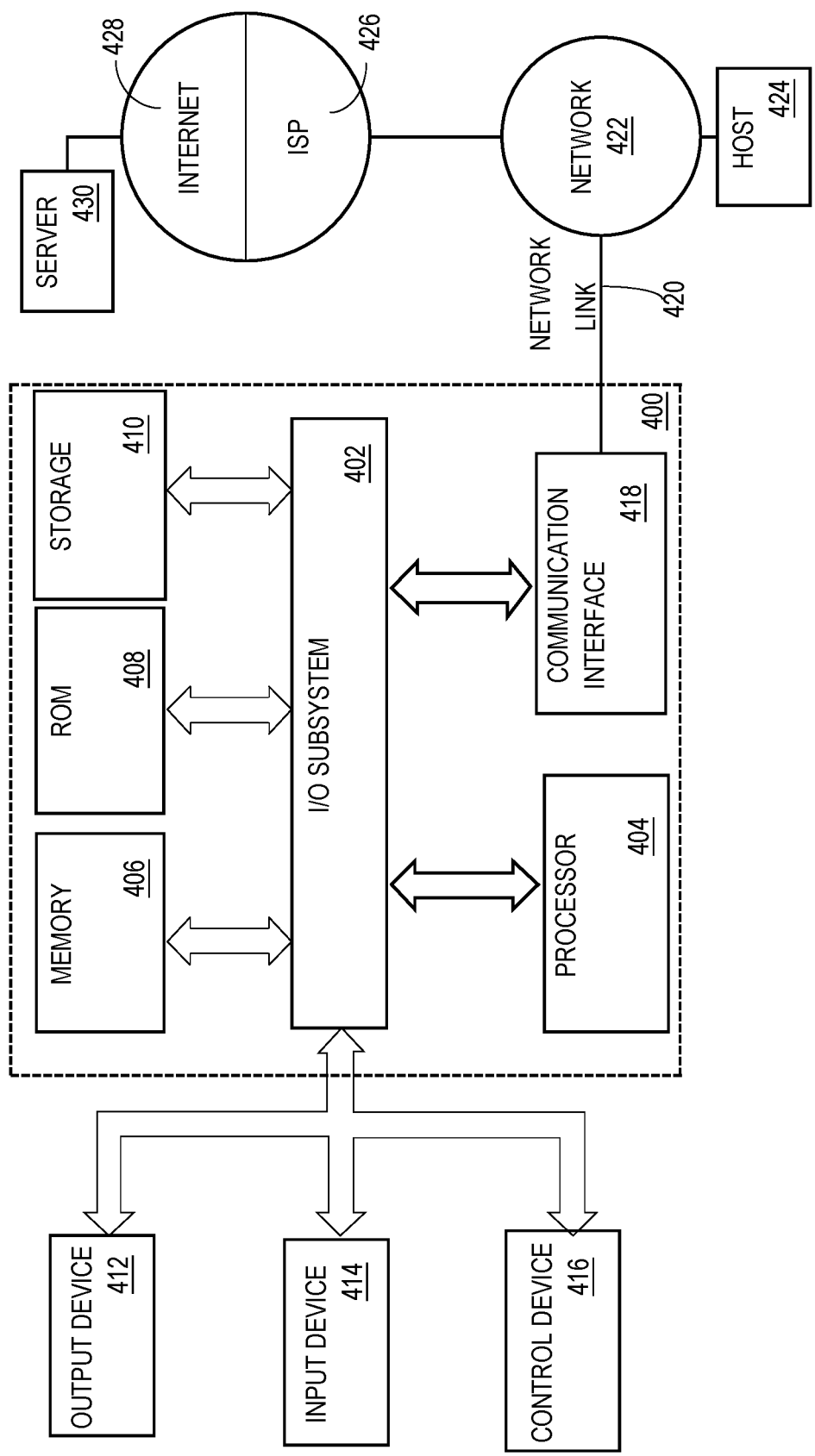
FIG. 4 is a block diagram of a computer system on which the techniques described herein may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for securely transmitting sensitive information between services over a network, comprising:
   receiving, at a client application executing on one or more first computing devices, a token from a token-originating service, wherein:
     the token corresponds to certain sensitive information that is available from the token-originating service,
     the token-originating service provides an application programming interface (API), and
     the client application requests the token via the API;
   sending the token from the client application to a target service executing on one or more second computing devices, wherein the target service requires the certain sensitive information to perform a particular action, and wherein the target service includes a plurality of client simulators;
   selecting, by the client application, a particular client simulator from the plurality of client simulators based on the particular client simulator supporting the API provided by the token-originating service;
   the target service causing the particular client simulator to use the token to obtain the certain sensitive information from the token-originating service via the API in a secure service-to-service communication over the network without exposing the certain sensitive information to the client application; and
   after obtaining the certain sensitive information from the token-originating service, the target service using the certain sensitive information to perform the particular action.

2. The method of claim 1 further comprising after obtaining the certain sensitive information from the token-originating service, the target service storing the certain sensitive information in a local cache.

3. The method of claim 2 further comprising:
   after storing the certain sensitive information, the target service receiving the token in a second message from the client application; and
   based on the token, retrieving the certain sensitive information from the local cache and using the certain sensitive information to perform another action.

4. The method of claim 3 further comprising storing, in association with the sensitive information, expiration information.

5. The method of claim 4 wherein the certain sensitive information is used to perform another action only if the expiration information indicates that the certain sensitive information is not expired.

6. The method of claim 1 wherein the token-originating service is one of a plurality of token-originating services from which the target service is configured to obtain sensitive information based on tokens created by the token-originating services.

7. The method of claim 1 wherein:
   the certain sensitive information includes bank account and routing information; and
   the particular action is an electronic transfer of funds involving the bank account.

8. The method of claim 1 wherein using the certain sensitive information to perform the particular action includes:
   using the certain sensitive information to perform a third-party service; and
   wherein the third-party service is provided by a third party different than a third party associated with the token-originating service.

9. The method of claim 1 wherein the target service includes a secure token exchange, the method comprising:
   the secure token exchange using the token to obtain the certain sensitive information from the token-originating service.

10. The method of claim 1, wherein the target service using the token to obtain the certain sensitive information from the token-originating service comprises:

the target service sending the token to a third-party service that includes a secure token exchange;

the secure token exchange using the token to obtain the certain sensitive information from the token-originating service without exposing any client application to the certain sensitive information; and the secure token exchange sending the certain sensitive information to the target service.

11. A system for securely transmitting sensitive information between services over a network, comprising:

a client application executing on one or more first computing devices; and a target service executing on one or more second computing devices, wherein the target service requires certain sensitive information to perform a particular action for the client application;

the client application being configured to receive a token from a token-originating service, wherein:

the token corresponds to the certain sensitive information that is available from the token-originating service, the token-originating service provides an application programming interface (API), and the client application requests the token via the API;

the client application being further configured to;

send the token from the client application to the target service, wherein the target service includes a plurality of client simulators; and select a particular client simulator, from the plurality of client simulators, based on the particular client simulator supporting the API provided by the token-originating service;

the target service being configured to:

cause the particular client simulator to use the token to obtain the certain sensitive information from the token-originating service via the API in a secure service-to-service communication over the network without exposing the certain sensitive information to the client application; and after obtaining the certain sensitive information from the token-originating service, use the certain sensitive information to perform the particular action.

12. The system of claim 11 wherein the target service is further configured to, after obtaining the certain sensitive information from the token-originating service, store the certain sensitive information in a local cache.

13. The system of claim 12 wherein the target service is further configured to:

after storing the certain sensitive information, receive the token in a second message from the client application; and based on the token, retrieve the certain sensitive information from the local cache and use the certain sensitive information to perform another action.

14. The system of claim 13 wherein the target service is further configured to store, in association with the sensitive information, expiration information and wherein the certain sensitive information is used to perform another action only if the expiration information indicates that the certain sensitive information is not expired.

15. The system of claim 11 wherein the token-originating service is one of a plurality of token-originating services from which the target service is configured to obtain sensitive information based on tokens created by the token-originating services.

16. The system of claim 11 wherein:

the certain sensitive information includes bank account and routing information; and the particular action is an electronic transfer of funds involving the bank account.

17. One or more non-transitory computer-readable media storing instructions which, when executed by one or more processors, cause the one or more processors to perform:

receiving, at a client application executing on one or more first computing devices, a token from a token-originating service, wherein:

the token corresponds to certain sensitive information that is available from the token-originating service, the token-originating service provides an application programming interface (API), and the client application requests the token via the API;

sending the token from the client application to a target service executing on one or more second computing devices, wherein the target service requires the certain sensitive information to perform a particular action, and wherein the target service includes a plurality of client simulators;

selecting, by the client application, a particular client simulator from the plurality of client simulators based on the particular client simulator supporting the API provided by the token-originating service;

the target service using causing the particular client simulator to use the token to obtain the certain sensitive information from the token-originating service via the API in a secure service-to-service communication over a network without exposing the certain sensitive information to the client application; and after obtaining the certain sensitive information from the token-originating service, the target service using the certain sensitive information to perform the particular action.

* * * * *